Feb. 10. 1925.

V. KASTNER

MOTOR VEHICLE

Filed July 8, 1924

1,526,222

Inventor
Viktor Kastner
per:
Attorney

Patented Feb. 10, 1925.

1,526,222

UNITED STATES PATENT OFFICE.

VIKTOR KASTNER, OF AACHEN, GERMANY.

MOTOR VEHICLE.

Application filed July 8, 1924. Serial No. 724,880.

*To all whom it may concern:*

Be it known that I, VIKTOR KASTNER, a citizen of Germany, residing at Aachen, No. 20 Bachstrasse, Rhenish Prussia, Germany, have invented certain new and useful Improvements in Motor Vehicles; and I do hereby declare the following to be a full, clear, and exact description of the invention, such as will enable others skilled in the art to which it appertains to make and use the same.

This invention relates to motor vehicles and has particular reference to a device for preventing the spring supported frame of such vehicles from moving laterally with relation to the axles.

According to the invention, this device comprises a pivot pin rigdly fixed on the axle casing in a vertical position and having mounted on it for swinging motion a double-armed lever between the arms of which and the side bars of the vehicle frame are disposed connecting rods which are connected both with the said lever arms as well as with the side bars by means of universal joints.

Figure 1:
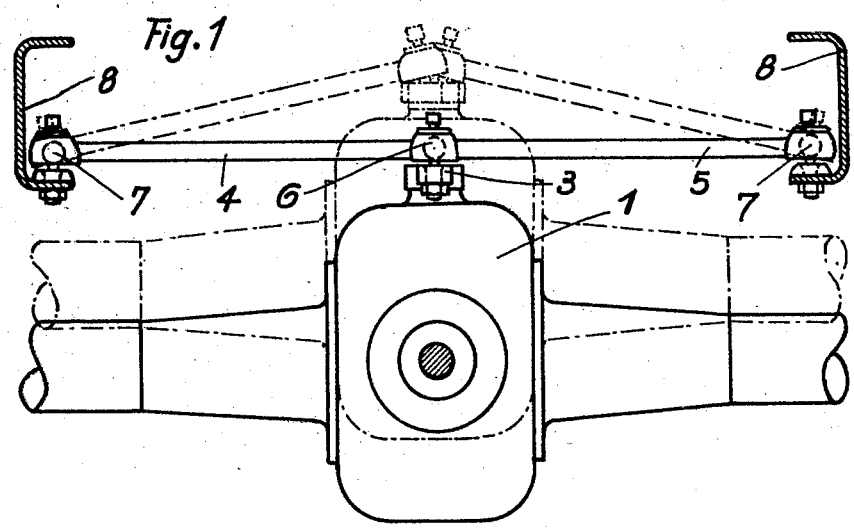
Figure 2:
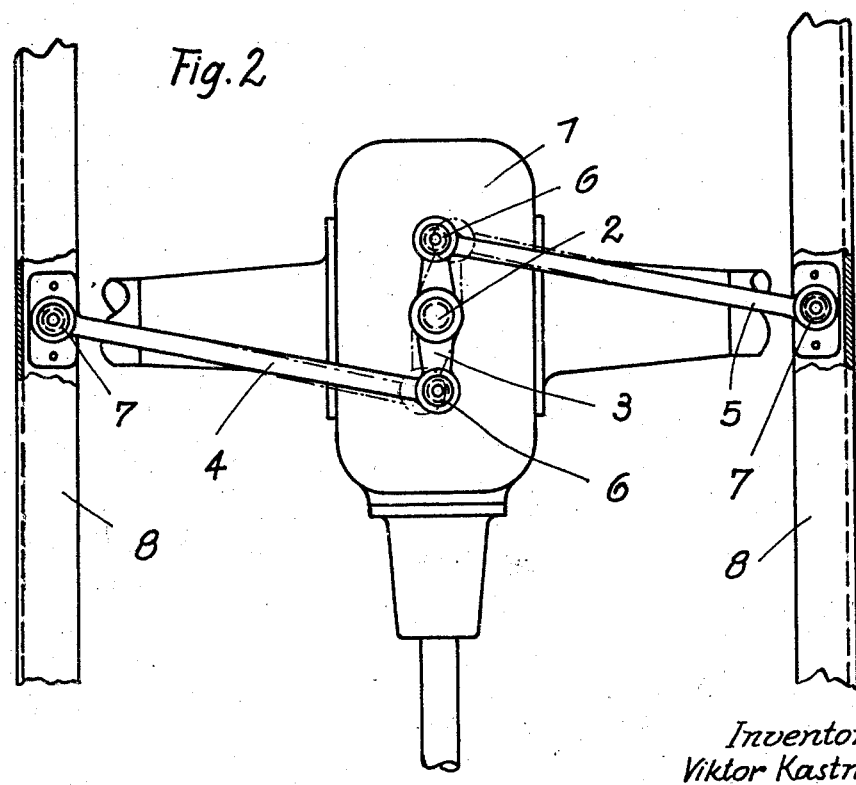

The invention will now be described with reference to the accompanyng drawing in which:

Fig. 1 is an elevation, partly in section, of the rear portion of a vehicle frame provided with a device according to the invention, and Fig. 2 is a corresponding plan view.

Fixed on the casing 1 of the rear axle at its upper side is a vertical pivot pin 2 on which is mounted for rotary swinging motion a double-armed lever 3. Pivoted to each of the arms of the double-armed lever 3 by means of ball pivots 6 are the ends of rods 4 and 5, respectively. The other ends of the rods 4 and 5 are pivotally connected each to one of the side bars 8 of the frame by means of ball joints 7. The double-armed balancing lever 3 usually extends in the direction of the longitudinal axis of the vehicle frame (see the position indicated by full lines).

If under the action of the springs (not shown) the vehicle frame 8 moves vertically with relation to the rear axle, the rods 4 and 5 likewise move in a vertical direction by their ends connected to the balancing lever 3 (see the position indicated by dot and dash lines). This movement causes a change of the distance between the pivot pin 2 and the points 7 at which the rods 4 and 5 are connected with the side bars 8 of the vehicle frame. This change is rendered possible by the universal connection of the rods 4, 5 both with the double-armed lever 3 and the side bars 8 as well as by the lever 3 being rotatable on the pivot pin 2. During this operation the lever 3 takes a position correspondingly inclined with relation to the longitudinal axis of the vehicle frame. This will also be the case if the frame will move with relation to the rear axle in the direction of the longitudinal axis of the vehicle. However, a lateral movement of the frame with relation to the rear axle cannot take place. Such movement is securely prevented by the rods 4, 5 and the double-armed balancing lever 3.

The described device is superior to similar well-known devices with which the pivot pin carrying the double-armed lever is arranged horizontally and in which no universal joints are provided between the connecting rods on the one hand and the lever and vehicle frame on the other hand. This well-known arrangement possesses the draw-back that, if the vertical springing movement of the vehicle frame increases, the frame will be subjected to a correspondingly increased lateral shifting movement with relation to the pivot pin of the double-armed lever and consequently also with relation to the vehicle axle.

Having thus described my invention, what I claim as new and desire to secure by Letters Patent, is:—

In a motor vehicle, in combination with the spring supported vehicle frame and the axles, a pivot pin fixed on the axle in a vertical position in the longitudinal middle plane of the frame, a double-armed lever mounted for rotary swinging motion on the pivot pin, oppositely extending connecting rods between the arms of the double-armed lever and the side bars of the vehicle frame, said rods being connected with the said lever arms and side bars by means of universal joints, and the lever and rods being adapted to prevent the vehicle frame from moving laterally with relation to the vehicle axles.

In testimony whereof I have signed my name to this specification.

VIKTOR KASTNER.